United States Patent Office 3,317,400
Patented May 2, 1967

3,317,400
ENZYMATIC MODIFICATION OF BOVINE GROWTH HORMONE BY PROTEOLYTIC STREPTOMYCETE CELL EXTRACTS
Fritz Reusser, Portage, Mich., assignor to The Upjohn Company, Kalamazoo, Mich., a corporation of Delaware
No Drawing. Filed Nov. 23, 1964, Ser. No. 413,306
1 Claim. (Cl. 195—2)

This invention relates to a process of preparing modified biologically active factors of mammalian pituitary, more particularly a process of modifying somatotropic factor of bovine pituitary glands by reacting said factor with enzymatic elaboration products of streptomycetes.

Bovine pituitary gland is known to be a source of various biologically active factors, some of which have been prepared in forms possessing specialized biological activity, for example, the growth factor, the follicle-stimulating factor, the luteinizing factor, the thyrotropic factor, the crop gland-stipulating factor and the adrenocorticotropic factor. It becoming evident that these factors are complex protein and protein-like substances, investigations are constantly under way in endeavors to prepare modified biologically active products therefrom, especially such products with modified relationships of biological activity, that is, factors which possess more or less of specific activities or are free of a specific activity. Such modified factors are valuable intermediates in further processing to arrive at essentially homogeneous factors with highly specific biological activity; the eventual aim of such modifications being elucidation of structure-function relationships so that synthetic peptides and polypeptides can be prepared with highly specific biological activity. Such further processing is exemplified by the technique known as electrophoresis on polyacrylamide gel to separate more completely the components of an individual factor and by zone electrophoresis on starch for essentially the same purpose.

It has now been found in accordance with the present invention that a somatotropic factor of bovine pituitary gland initially possessing somatotropic, lipolytic and immunological activities can be modified by a process of enzymatic hydrolysis to yield products wherein the ratios of such activities differ from those of unmodified factor. As aforesaid these modified products are valuable intermediates for further processing in the preparation and study of the activities, peptide and amino acid content of somatotropic factor of bovine pituitary glands.

Generally described, the process comprises reacting the somatotropic factor with a proteolytic elaboration product of certain streptomycetes under controlled conditions of pH, time and temperature which usually produce some non-protein nitrogen. A pH range of about 4 to about 11, preferably about 10 is used. A temperature of about 10° C. to about 30° C. is operable, preferably about 25° C. The reaction is then stopped after 1 to 6 hours by the addition of a protein precipitating agent, for example, aqueous trichloracetic acid 5% to 20% concentration, or ¼% sodium tungstate in 5% trichloracetic acid. The precipitate is separated, e.g., by centrifugation and recovered. The recovered material can be purified by dissolving in alkali and dialyzing against purified water. The dialyzed solution is adjusted as to pH and applied to a column of cross-linked dextran gel which has been previously equilibrated with sodium carbonate-bicarbonate aqueous buffer. Absorbed material is removed from the gel by fractional elution with the buffer, the protein content of the fractional eluates being determined by readings of optical densities by methods known in the art, for example at 280 m$\mu$ in a Beckman D.U. spectrophotometer against a water blank. As peaks of protein content appear in the fractional eluates, the eluates corresponding thereto are combined, freed of buffer by dialysis against purified water, and concentrated to dryness by lyophilization. The protein corresponding to the various peaks is recovered as a dry powdery material.

Assays for somatotropic and lipolytic activity and determination of immunological response on the starting somatotropic factor of bovine pituitary and on the recovered dry material show that significant modifications of such activities have occurred.

As used herein bovine somatotropic factor means the factor prepared from bovine glands according to Wilhelmi, "Hypophyseal Growth Hormone, Nature and Actions" (R. W. Smith et al., eds.), pp. 59–69 (1955), and further purified as described by Reusser, Arch. Biochem. Biophys. 106:410, (1964).

The streptomycetes used in the instant process have been designated *Streptomyces pallidus* Sp. N., *Streptomyces moderatus* Sp. N., *Streptomyces regalis*, Sp. N., and *Streptomyces rosa*, Sp. N. A culture of each living organism can be obtained from the permanent collection of the Northern Utilization Research and Development Division, Agriculture Research Service, Peoria, Ill., U.S.A. The respective accession numbers in this repository are NRRL No. 3149, NRRL No. 3150, NRRL No. 3151, and NRRL No. 3152.

Appearance and microscopic characterizations of the organisms are given in Tables I and II.

TABLE I.—APPEARANCE OF CULTURES ON EKTACHROME [1]
Agar Medium

| Culture | Bennett's | | Czapek's Sucrose | | Maltose-Tryptone | | Peptone-Iron | | 0.1% Tyrosine | | Casein Starch | |
|---|---|---|---|---|---|---|---|---|---|---|---|---|
| | Surface | Reverse | Surface | Reverse | Surface | Reverse | Surface | Reverse | Surface | Reverse | Surface | Reverse |
| S. pallidus | Gray-pink. | Brown | Gray-pink. | Yellow-tan. | Fair gray-pink. | Brown | None | Brown | Trace gray-pink. | Tan | Pink | Tan. |
| S. moderatus | Trace pink. | Yellow | Pink | Yellow | Gray-pink. | Tan | do | Yellow | do | Pale pink-tan. | Gray-pink. | Pink-tan. |
| S. regalis | Blue | Brown | Trace blue. | Brown | Blue | Brown | No aerial | Brown | Blue | Tan-brown. | Trace blue. | Tan-brown. |
| S. rosa | Salmon | do | Salmon | Yellow | Salmon | do | Trace salmon. | Yellow | Trace salmon. | Red | Salmon | Yellow-tan. |

[1] Dietz, A., Ektachrome Transparencies as Aids in Actinomycete Classification, Annals of the N.Y. Academy of Science, 60:152-154, 1954.

TABLE II.—MICROSCOPIC CHARACTERISTICS

|  | S. pallidus | S. moderatus | S. regalis | S. rosa |
|---|---|---|---|---|
| Light microscope (Sporophore type) | S, RA | RF | Short RA, S to questionalble BIV-S. | S, RA. |
| Electron microscope (Spores): |  |  |  |  |
| Direct | Smooth | Smooth | Warty | Smooth. |
| Carbon Replica | Smooth rectangles, basket-weave surface pattern, some ridging. | Smooth rectangles, basket-weave surface pattern, ridging. | Warty | Smooth, short rectangles (box-like), basket-weave pattern nucleus. |

Utilization of carbon compounds in a synthetic medium is given in Table III.

TABLE III.—UTILIZATION OF CARBON COMPOUNDS IN A SYNTHETIC MEDIUM*

|  |  | S. pallidus | S. moderatus | S. regalis | S. rosa |
|---|---|---|---|---|---|
|  | Control | − | (−) | + | − |
| 1 | D-xylose | + | + | + | + |
| 2 | L-arabinose | (+) | (+) | (+) | + |
| 3 | Rhamnose | (+) | + | (+) | + |
| 4 | D-fructose | + | + | + | + |
| 5 | D-galactose | + | + | (+) | + |
| 6 | D-glucose | + | + | + | + |
| 7 | D-mannose | + | + | (+) | + |
| 8 | Maltose | + | + | (+) | (−) |
| 9 | Sucrose | + | (+) | (+) | + |
| 10 | Lactose | + | + | (+) | + |
| 11 | Cellobiose | + | + | (+) | (−) |
| 12 | Raffinose | + | + | (+) | + |
| 13 | Dextrin | + | + | (+) | (−) |
| 14 | Inulin | + | (−) | (+) | + |
| 15 | Soluble starch | + | + | (+) | (+) |
| 16 | Glycerol | + | (+) | − | (+) |
| 17 | Dulcitol | (−) | (+) | (+) | (+) |
| 18 | D-mannitol | + | + | (+) | (+) |
| 19 | D-sorbitol | + | (+) | (−) | (+) |
| 20 | Inositol | + | (+) | − | − |
| 21 | Salicin | − | − | − | − |
| 22 | Phenol | − | − | − | − |
| 23 | Cresol | − | − | − | − |
| 24 | Na formate | − | − | − | − |
| 25 | Na oxalate | (−) | (−) | − | (+) |
| 26 | Na tartrate | + | + | − | (+) |
| 27 | Na salicylate | − | − | (+) | − |
| 28 | Na acetate | (+) | + | (+) | (+) |
| 29 | Na citrate | − | (−) | (+) | − |
| 30 | Na succinate | + | + | (+) | + |

+ = Utilization.
(+) = Utilization, slight growth.
(−) = Slight growth, no utilization.
− = No growth.
*Pridham, T. G. and Gottlieb, D., Assimilation of Carbon compounds in Synthetic Medium, J. Bact., 56:107–114, 1948.

Cultural and physiological characteristics are given in Table IV.

TABLE IV.—CULTURAL AND PHYSIOLOGICAL CHARACTERISTICS

| Agar Medium | Culture ||||
|---|---|---|---|---|
|  | S. pallidus | S. moderatus | S. regalis | S. rosa |
| Peptone-iron: |  |  |  |  |
| Surface | Gray-pink | Gray-pink-tan | None | Pink. |
| Reverse | Brown | Orange-tan | Brown | Rose-tan. |
| Pigment | do | do | do | Pale tan. |
| Other | Melanin + | Melanin − | Melanin + | Melanin −. |
| Calcium malate: |  |  |  |  |
| Surface | Cottony pink | Gray-pink-tan | Trace white | Tan. |
| Reverse | Cream | Pale pink-tan | Gray-blue | Pink-tan. |
| Pigment | None | None | None | None. |
| Other | Malate not solubilized | Malate slightly solubilized | Malate solubilized | Malate not solubilized. |
| Glucose asparagine: |  |  |  |  |
| Surface | Pink-white | None to slight trace pink | None | Pink to tan. |
| Reverse | Cream | Tan | Tan | Orange-tan. |
| Pigment | Pale yellow | Tan | Tan | Do. |
| Skim milk: |  |  |  |  |
| Surface | Trace gray | Very slight trace pink | Yellow-tan | Trace pink-tan. |
| Reverse | Tan | Tan | do | Orange-tan. |
| Pigment | do | do | do | Do. |
| Other | Casein not solubilized | Casein solubilized | Casein not solubilized | Casein solubilized. |
| Tyrosine: |  |  |  |  |
| Surface | Trace pink | Pink-tan | None | Pink-tan. |
| Reverse | Brown | do | Brown | Orange-tan. |
| Pigment | do | Pale tan | do | Do. |
| Other | Tyrosine slightly solubilized | Tyrosine solubilized | Tyrosine solubilized | Tyrosine not solubilized. |

TABLE IV.—Continued

| Agar Medium | Culture | | | |
|---|---|---|---|---|
| | S. pallidus | S. moderatus | S. regalis | S. rosa |
| Xanthine: | | | | |
| Surface | Trace pale pink | Pink-tan | None | Pink. |
| Reverse | Pale yellow-tan | do | Tan | Pale tan. |
| Pigment | do | Pale pink | do | Do. |
| Other | Xanthine solubilized | Xanthine solubilized | Xanthine solubilized | Xanthine solubilized. |
| Casein starch: | | | | |
| Surface | Cottony pink | Pink | Pale blue-tan | Pink-tan. |
| Reverse | Pale yellow-tan | do | do | Do. |
| Pigment | do | None | None | None. |
| Yeast extract, malt extract: | | | | |
| Surface | Cottony pink | Fair pink-tan | Very slight trace white | Rose-tan. |
| Reverse | Tan-brown | Tan | Tan | Brown. |
| Pigment | Tan | do | do | Brown-tan. |
| Bennett's:[1] | | | | |
| Surface | 5 ba (g+m), pinkish white | 5 ba (g+m), pinkish white | 13 ba (g), bluish white | 2 ec (g), grayish yellow. |
| Reverse | 5 ie (g), light olive brown; to 3 pi (g), deep yellowish brown. | 4 ie (g), light brown; to 4 lg (g), moderate brown. | 10 ml (g), dark grayish blue to dark grayish purple. | Do |
| Pigment | None | None | 10 ml (g), dark grayish blue to dark grayish purple. | None. |
| Optimum temperature | 24°–37° C | 24°–28° C | 28°–37° C | 24°–37° C. |
| Czapek's sucrose:[1] | | | | |
| Surface | a (g+m), white | 3 ba (m)[2] | 10 ml (g), dark grayish blue and dark grayish purple; to 5 pn (g), brownish gray. | 4 ec (g), brownish pink. |
| Reverse | 2 gc (g+m), grayish yellow. | 3 le (g), strong yellowish brown. | 9 pn (m), dark purplish gray; to 8 pn (g), dark grayish reddish brown. | Do. |
| Pigment | None | | 8 pn (g), dark grayish reddish brown. | None. |
| Optimum temperature | 24°–37° C | 24°–28° C | 28°–37° C | 24°–37° C. |
| Maltose-Tryptone:[1] | | | | |
| Surface | a (g+m), white | 5 ba (g+m), pinkish white | 15 cb (g), light bluish gray; to 12½ ca (g), very pale purple. | 2 cb (g), yellowish gray. |
| Reverse | 3 pi (g), deep yellowish brown; to 3 pn (m), dark grayish yellowish brown. | 5 ni (g), moderate reddish brown. | 5 pn (m), brownish gray; to 5 nl (g), dark grayish brown. | 4 ni (g), moderate brown; to 3 lg (g), moderate yellowish brown. |
| Pigment | None | None | 3 li (g), moderate olive brown. | 2 lg (m), light olive brown. |
| Optimum temperature | 24°–37° C | 24°–28° C | 24°–37° C | 24°–37° C. |
| Gelatin: | | | | |
| Plain: | | | | |
| Pigment | Brown, top ¼ of medium | Pink-tan, top ⅓ of medium | Brown | Trace tan. |
| Liquefaction | Complete | Complete | Complete | Complete. |
| Nutrient: | | | | |
| Pigment | Brown, top ¼ of medium | None | Brown | Trace tan. |
| Liquefaction | Complete | Complete | Complete | Complete. |
| Broth: | | | | |
| Nutrient nitrate: | | | | |
| Surface | White aerial growth | Trace white aerial growth | Trace white aerial growth | No aerial growth. |
| Vegetative | Flocculent bottom growth | Loose bottom growth | Tan throughout and at base | Colorless vegetative at base. |
| Pigment | Tan | None | Tan | None. |
| Other | No reduction | Reduction | Reduction | No reduction. |
| Synthetic nitrate: | | | | |
| Surface | Good cottony white aerial growth. | Trace white aerial growth | Pale lavender-white aerial growth. | Pale pink aerial on surface pellicle. |
| Vegetative | Compact to flocculent bottom growth. | Loose bottom growth | Pale lavender at base | Trace throughout; slight compact bottom growth. |
| Pigment | None | None | Pale lavender | None. |
| Other | No reduction | No reduction | Reduction | No reduction. |
| Litmus milk: | | | | |
| Surface | Trace white aerial growth | Trace white aerial growth | Trace cottony white aerial growth. | No aerial growth. |
| Peptonization | None | Positive | Positive | Trace. |
| pH | 6.1 | 7.7 | 7.8 | 6.1. |

[1] Color on Bennett's, Czapek's Sucrose, and Maltose-Tryptone was determined by using color chips from the Color Harmony Manual, 3rd Ed., 1948, and redefining in terms of the color descriptions in the ISCC-NBS Method of Designating Colors and Dictionary of Color Names, NBS Circular 553, 1955.
[2] No ISCC-NBS color.

Cultures of the respective streptomycetes were grown in shake flasks in a sterile medium of pH 7.2, containing 25 gm. cerelose and 25 gm. cottonseed flour, industrial grade (Pharmamedia, Traders Oil Mill Company, Fort Worth, Texas, U.S.A.) per liter of tap water. The flasks were inoculated with a small loop of spore material from a soil stock and incubated for 5 days at 28° C. At this time the mycelia were harvested as filter cakes and the filter cakes were washed thoroughly with purified water U.S.P. The washed cakes were frozen at −20° C. and re-thawed to facilitate cell breakage. Three hundred gm. of wet cake was resuspended in purified water, 600 ml. of dry glass beads was added and the total volume was made up to 1200 ml. with more purified water. The whole was homogenized in a colloid mill and the homogenate was centrifuged at about 2° C. to yield a clear supernatant. This supernatant was frozen, dried from the frozen state to a powder, which is stored at 2° C. As required for use in the inventive process, 5 mg. of the dry powder was dissolved in 5 ml. of 0.05 M sodium carbonate-bicarbonate buffer of pH 10.

How to perform the inventive process and the best mode contemplated by the inventor of carrying out the invention are set forth below for exemplification only, and not for limitation of the scope of the invention.

Somatotropic activity was determined by the rat tibia assay. Greenspan et al., Endocrinology, 45:455 (1949). Lipolytic activity was determined in the epididymal rat pad system. Marshal and Engel, J. Lipid Res. 1:339 (1960). Bovine growth hormone antiserum was prepared and tested for specificity as described by Moudgal and Li, Arch. Biochem. Biophys., 93:112 (1961).

EXAMPLE 1

Two hundred mg. bovine somatotropic factor was dissolved in 15 ml., 0.05 M sodium carbonate-bicarbonate buffer of pH 10. Enzymatic hydrolysis was started by the addition of 5 ml. of enzyme solution (1 mg. of dry enzyme prepared from *Streptomyces moderatus* Sp. N., above identified, dissolved in each ml. of 0.05 M-carbonate buffer of pH 10). Hydrolysis proceeded at room temperature with slow stirring for about one hour, after which time the hydrolysis was stopped by the addition of an equal volume of 10% aqueous trichloracetic acid (2° C.). The whole was allowed to stand at about 2° C. for one hour and was then centrifuged at room temperature. The supernatant contained nitrogen equivalent to 6% of the initial total nitrogen. The precipitate was recovered and dissolved in 19 ml. 0.5 N sodium hydroxide. The solution was dialyzed in cellophane (Visking dialysis cellophane tube) for approximately six hours against running cold deionized water. This dialyzed solution was adjusted to about pH 10 with solid NaHCO$_3$ and the resultant solution was applied to a column of cross-linked dextran gel having a water regain value of 10 gm./per/gm. of dry weight (Sephadex G–100, Pharmacia, Uppsala, Sweden).

The column was prepared with gel of a bead size greater than 180 mesh, which had been washed with 0.05 M sodium carbonate-bicarbonate buffer of pH 10. The dimensions of the column were diameter, 2.8 centimeter X height, 80 centimeter. The column was equilibrated with the same buffer before addition of the above-mentioned dialyzed solution.

Elution was carried out with the sodium carbonate-bicarbonate buffer. Fractional eluates of 10 ml. were collected and the optical densities thereof were read at 280 mμ in a Beckman D.U. spectrophotometer against a water blank. Fractional eluates corresponding to various peaks of optical density were combined, dialyzed overnight in cellophane tubing against running deionized water, and the dialyzed solution was concentrated to dryness by lyophilization to white, fluffy powders. In the exepriment three sequential peaks yielded powders 1, 2 and 3, respectively.

The biological and immunological activities of the powders were as follows:

| Powder | Somatotropic Assay | | | Lipolytic Assay | | | Qualitative Immun. Assay [1] |
|---|---|---|---|---|---|---|---|
| | No. of Rats | Dose/rat, μg. N | Tibia Width | No. of Rats | Dose/rat, μg. N | μM FFA per 100 mg. and 3 hr. | |
| Peak 1 | 5 / 5 | 40 / 10 | 195 / 198 | 2 / 2 | 10 / 10 | .42 | + |
| Peak 2 | 4 / 4 | 40 / 10 | 269 / 185 | 2 / 2 | 10 / 10 | .41 | ++ |
| Peak 3 | 3 / 5 | 40 / 10 | 186 / 307 | 2 / 2 | 10 / 10 | .46 | |
| Bovine Growth Hormone | 3 | 40 / 10 | 274 | 2 | 10 | 1.92 | ++ |
| Control | 5 | | 183 | 6 | None | .21 | |

[1] ++=strong band; +=weak band.

EXAMPLE 2

Following the procedure of Example 1, another 200 mg. of bovine somatotropic factor was enzymatically hydrolyzed with 5 ml. of enzyme solution prepared as heretofore described from *Streptomyces pallidus*, Sp. N. Enzymatic hydrolysis was allowed to proceed for 6 hours. The supernatant contained nonprotein nitrogen equivalent to 3% of the initial total nitrogen.

Again, dry powders were obtained by lyophilization of the combined fractional eluates, collected as in Example 1. The biological and immunological activities of the powders were as follows:

| Powder | Somatotropic Assay | | | Lipolytic Assay | | | Qualitative Immun. Assay [1] |
|---|---|---|---|---|---|---|---|
| | No. of Rats | Dose/rat, μg. N | Tibia Width | No. of Rats | Dose/rat, μg. N | μM FFA per 100 mg. and 3 hr. | |
| Peak 1 | 3 / 4 | 40 / 10 | 184 / 186 | 2 / 2 | 10 / 10 | .37 | + |
| Peak 2 | 5 / 5 | 40 / 10 | 268 / 209 | 2 / 2 | 10 / 10 | .56 | ++ |
| BGH, Std | 5 / 3 | 40 / 10 | 307 / 274 | 2 / 2 | 10 / 10 | 1.92 | ++ |
| Control | 5 | | 183 | 6 | None | .21 | |

[1] ++=strong band; +=weak band.

EXAMPLE 3

Two hundred additional mg. of bovine somatotropic factor was processed according to the above directions, except that the enzyme was that obtained from *Streptomyces rosa*, Sp. N., and the period of hydrolysis was four hours, after which time it was stopped by the addition of the cold trichloracetic acid solution. The supernatant did not contain nonprotein nitrogen.

The biological and immunological activities of the powders were as follows:

| Powder | Somatotropic Assay | | | Lipolytic Assay | | | Qualitative Immun. Assay [1] |
|---|---|---|---|---|---|---|---|
| | No. of Rats | Dose/rat, μg. N | Tibia Width | No. of Rats | Dose/rat, μg. N | μM FFA per 100 mg. and 3 hr. | |
| Peak 1 | 5 / 5 | 40 / 10 | 188 / 189 | 2 / 2 | 10 / 10 | .27 | ++ |
| Peak 2 | 5 / 4 | 40 / 10 | 272 / 262 | 2 / 2 | 10 / 10 | 1.05 | ++ |
| BGH, Std | 5 / 3 | 40 / 10 | 307 / 274 | 2 / 2 | 10 / 10 | 1.92 | ++ |
| Control | 5 | | 183 | 6 | None | .21 | |

[1] ++=strong band; +=weak band.

EXAMPLE 4

An additional 200 mg. of bovine somatotropic factor was processed according to the aforesaid directions, except that the enzyme used was obtained from *Streptomyces regalis*, Sp. N., and the period of hydrolysis was two hours. The supernatant contained nonprotein nitrogen equivalent to 4% of the initial total nitrogen.

The biological and immunological activities of the so-prepared powders were as follows:

| Powder | Somatotropic Assay | | | Lipolytic Assay | | | Qualitative Immun. Assay [1] |
|---|---|---|---|---|---|---|---|
| | No. of Rats | Dose/rat, μg. N | Tibia Width | No. of Rats | Dose/rat, μg. N | μM FFA per 100 mg. and 3 hr. | |
| Peak 1 | 5 | 40 | 151 | 2 | 10 | .63 | + |
| | 5 | 10 | 176 | 2 | 10 | | |
| Peak 2 | 5 | 40 | 280 | 2 | 10 | 1.17 | ++ |
| | 3 | 10 | 260 | 2 | 10 | | |
| BGH, Std | 5 | 40 | 307 | 2 | 10 | 1.92 | ++ |
| | 3 | 10 | 274 | 2 | 10 | | |
| Control | 5 | | 183 | 6 | None | .21 | |

[1] ++=strong band; +=weak band.

Recapitulation of biological and immunological activity tests

The biological data in the above examples show that the powders from the first peaks of eluates did not retain somatotropic activity. Except for the powder of the first peak in Example 4, none retained significant lipolytic activity. Each powder reacted immunologically positive with bovine growth hormone anti-serums, but generally to a weaker extent than unmodified material. All peak 2 powders retained significant but varying degrees of somatotropic and lipolytic activities; and immunological activities were indistinguishable from ureacted bovine somatotropic factor.

Polyacrylamide gel electrophoresis

All powders were subjected to polyacrylamide gel electrophoresis with the basic standard gels of Ornstein and Davis, "Disc Electrophoresis," Distillation Products Industries, Rochester, New York, 1962. Operational and staining procedures were used according to Reusser, Arch. Biochem. Biophys. 106:410, (1964). All of the electrophoretic patterns differed from those of unreacted somatotropic factor. The powders corresponding to first peaks of eluate in each case remained within the sample gels and did not migrate in the electrophoretic field. Powders corresponding to the second peak of eluted material in Examples 2, 3, and 4 showed four similar patterns when compared with each other. All indicated the presence of 4 bands increasing in density from the cathode to the anode. There also existed a similarity to the pattern obtained with unhydrolyzed somatotropic factor. However, the latter yielded an electropherogram with five bands decreasing gradually in intensity from the cathode to the anode. The electropherogram from peak 2 of Example 1 differed significantly from that of the unmodified somatotropic factor.

Relative amino acid composition

Acid hydrolyses of samples were carried out in constant boiling hydrochloric acid for 22 and 72 hours at 110° C. in an evacuated sealed tube according to the method of Moore et al., Methods Enzymol., 6, 819 (1963). Amino acid compositions of the hydrolysates were determined in an automatic Spinco amino acid analyzer as described by Spackman et al., Anal. Chem., 30, 1190 (1958). The results were as follows:

TABLE.— RELATIVE AMINO ACID COMPOSITION OF BGH—FRAGMENTS EXPRESSED IN MOLAR RATIOS

| Amino Acid | 14,609 | | | 14,403 | | 109 | | 14,706 | | BGH |
|---|---|---|---|---|---|---|---|---|---|---|
| | 1 | 2 | 3 | 1 | 2 | 1 | 2 | 1 | 2 | |
| Lysine | 17 | 19 | 20 | 18 | 23 | 18 | 24 | 23 | 24 | 25 |
| Histidine | 4 | 11 | 13 | 5 | 7 | 6 | 9 | 8 | 14 | 8 |
| Arginine | 20 | 20 | 25 | 21 | 26 | 22 | 21 | 23 | 21 | 25 |
| Aspartic acid | 32 | 37 | 45 | 32 | 37 | 33 | 39 | 38 | 43 | 33 |
| Threonine | 24 | 27 | 31 | 23 | 27 | 23 | 36 | 28 | 31 | 26 |
| Serine | 26 | 32 | 38 | 20 | 31 | 21 | 23 | 32 | 36 | 29 |
| Glutamic acid | 48 | 47 | 51 | 48 | 51 | 49 | 51 | 53 | 54 | 50 |
| Proline | 15 | 15 | 17 | 14 | 15 | 12 | 21 | 15 | 20 | 15 |
| Glycine | 22 | 30 | 32 | 22 | 26 | 22 | 27 | 26 | 29 | 22 |
| Alanine | 28 | 32 | 45 | 29 | 35 | 30 | 35 | 33 | 41 | 31 |
| Valine | 14 | 17 | 13 | 14 | 16 | 14 | 19 | 15 | 19 | 16 |
| Methionine | 7 | 8 | 12 | 7 | 7 | 5 | 13 | 5 | 8 | 8 |
| Isoleucine | 14 | 14 | 11 | 14 | 14 | 14 | 14 | 14 | 13 | 14 |
| Leucine | 52 | 52 | 52 | 52 | 52 | 52 | 52 | 52 | 52 | 52 |
| Tyrosine | 10 | 11 | 18 | 10 | 14 | 9 | 17 | 13 | 14 | 12 |
| Phenylalanine | 23 | 25 | 32 | 10 | 29 | 25 | 31 | 28 | 28 | 25 |

The above amino acid compositions are expressed in molar ratios related to 52 leucine residues as observed in unprocessed bovine somatotropic factor. The data show that despite the minor differences among all fractions, none showed an amino acid spectrum significantly different from unreacted bovine somatotropic factor. All the fractions had a high content of the acidic amino acids, leucine and valine and had almost constant values for isoleucine.

The powders from all first peaks were found to have apparent molecular weights exceeding that of the starting growth hormone by a factor of at least 2. All powders had significant sequestering capacities for ions especially for sodium and magnesium, ash content being above 50 percent in some instances.

What is claimed is:

A process of preparing modified biologically active factors of mammalian pituitaries which comprises:

(1) reacting bovine somatotropic factor with a proteolytice elaboration product of a member selected from the group consisting of *Streptomyces moderatus*, Sp. N.; *Streptomyces pallidus*, Sp. N.; *Streptomyces rosa*, Sp. N.; and *Streptomyces regalis*, Sp. N. at a pH of from about 4 to about 11 for from about 1 to about 6 hours at a temperature of from about 10° C. to about 30° C.;

(2) adding a protein precipitating agent to the reaction mixture to form a precipitate;

(3) separating and recovering the precipitate;

(4) dissolving the precipitate in aqueous sodium hydroxide and dialyzing the solution against purified water;

(5) adjusting the Ph of the dialyzed solution to about pH 10 and applying the adjusted solution to a column of cross-linked dextran gel having a water regain value of about 100 gm. per gm. equilibrated with 0.05 M sodium carbonate-bicarbonate aqueous buffer of pH about 10;

(6) fractionally eluting absorbed material from the gel with 0.05 M sodium carbonate-bicarbonate aqueous buffer of pH about 10;

(7) combining fractions of eluate corresponding to peaks of protein in the eluate; and (8) recovering as dry powders modified biologically active factors from said combined fractional eluates by volatilizing water therefrom in vacuo, said powders demonstrating modified ratios of lipolytic, somatotropic and immunological activity.

References Cited by the Examiner

UNITED STATES PATENTS 3,127,327  3/1964  Nomoto et al. -------- 195—62

OTHER REFERENCES

Li et al., Journal of Biological Chemistry, January 1956, vol. 218, pp. 41–52.

A. LOUIS MONACELL, *Primary Examiner.*

L. M. SHAPIRO, *Assistant Examiner.*

UNITED STATES PATENT OFFICE
CERTIFICATE OF CORRECTION

Patent No. 3,317,400                                         May 2, 1967

Fritz Reusser

It is hereby certified that error appears in the above numbered patent requiring correction and that the said Letters Patent should read as corrected below.

Column 1, line 22, for "gland-stipulating" read -- gland-stimulating --; column 9, line 48, for "ureacted" read -- unreacted --; column 10, line 74, for "proteolytice" read -- proteolytic --; column 11, line 11, for "Ph" read -- pH --; line 15, for "100 Gm." read -- 10 Gm. --.

Signed and sealed this 21st day of November 1967.

(SEAL)
Attest:

Edward M. Fletcher, Jr.                                    EDWARD J. BRENNER

Attesting Officer                                              Commissioner of Patents